US009832002B2

(12) United States Patent
Xu et al.

(10) Patent No.: US 9,832,002 B2
(45) Date of Patent: Nov. 28, 2017

(54) PHALANX RADIO SYSTEM ARCHITECTURE FOR HIGH CAPACITY WIRELESS COMMUNICATION

(71) Applicant: Huawei Technologies Co., Ltd., Shenzhen (CN)

(72) Inventors: Xinyu Xu, Kanata (CA); David Wessel, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/333,803

(22) Filed: Jul. 17, 2014

(65) Prior Publication Data

US 2016/0021552 A1 Jan. 21, 2016

(51) Int. Cl.
- *H04L 5/14* (2006.01)
- *H04W 16/26* (2009.01)
- *H04W 16/32* (2009.01)
- *H04W 88/08* (2009.01)

(52) U.S. Cl.
CPC .............. *H04L 5/14* (2013.01); *H04W 16/26* (2013.01); *H04W 16/32* (2013.01); *H04W 88/085* (2013.01)

(58) Field of Classification Search
None
See application file for complete search history.

(56) References Cited

U.S. PATENT DOCUMENTS

| | | | | |
|---|---|---|---|---|
| 5,809,422 A | * | 9/1998 | Raleigh ............... | H04B 7/2609 455/444 |
| 6,785,558 B1 | * | 8/2004 | Stratford ............... | H04L 1/0625 455/522 |

(Continued)

FOREIGN PATENT DOCUMENTS

| | | |
|---|---|---|
| CN | 101953223 A | 1/2011 |
| CN | 102378202 A | 3/2012 |

(Continued)

OTHER PUBLICATIONS http://www.alcatel-lucent.com/solutions/lightradio, "LightRadio Evolve Your Wireless Broadband Network," downloaded Apr. 22, 2014, 4 pages.

(Continued)

*Primary Examiner* — Ayaz Sheikh
*Assistant Examiner* — Tarell Hampton
(74) *Attorney, Agent, or Firm* — Slater Matsil, LLP

(57) ABSTRACT

System and apparatus embodiments are provided for high capacity wireless communication. In an embodiment, a system for high capacity wireless communication includes a plurality of small radio unit modules (SRUMs) and a single central module (CM) configured to connect to the SRUMS over a high speed transport layer (TL), wherein the SRUMs each comprise a SRUM radio frequency (RF) element and an antenna, wherein the CM comprises a digital signal processor (DSP), an analog-to-digital (A/D) converter, a plurality of digital-to-analog (D/A) converters, and a plurality of CM RF elements, wherein each of the plurality of SRUMs is uniquely associated with a CM RF element, and a D/A converter thereby forming a radio unit (RU) that is configured to operate independently of other RUs.

26 Claims, 8 Drawing Sheets

(56) References Cited

U.S. PATENT DOCUMENTS

| | | | | |
|---|---|---|---|---|
| 6,801,767 B1* | 10/2004 | Schwartz | H04B 10/25755 | 398/115 |
| 2005/0143091 A1* | 6/2005 | Shapira | H04W 64/00 | 455/456.1 |
| 2006/0209800 A1* | 9/2006 | Lee | H04L 63/08 | 370/352 |
| 2006/0229079 A1* | 10/2006 | Cheng | H04W 16/14 | 455/450 |
| 2007/0270185 A1* | 11/2007 | Yagawa | H04W 24/10 | 455/561 |
| 2009/0067363 A1* | 3/2009 | Ruiz | H04W 24/00 | 370/315 |
| 2009/0180426 A1* | 7/2009 | Sabat | H04W 88/085 | 370/328 |
| 2009/0310972 A1* | 12/2009 | Wayman | H04B 10/25759 | 398/115 |
| 2010/0087227 A1* | 4/2010 | Francos | H03F 1/3247 | 455/562.1 |
| 2010/0144337 A1* | 6/2010 | Dean | H04W 24/02 | 455/422.1 |
| 2010/0177759 A1* | 7/2010 | Fischer | H04W 88/085 | 370/345 |
| 2010/0208777 A1* | 8/2010 | Ogaz | H04L 12/2838 | 375/219 |
| 2011/0003608 A1 | 1/2011 | Forenza et al. | | |
| 2011/0135013 A1* | 6/2011 | Wegener | H03M 7/40 | 375/241 |
| 2011/0170496 A1* | 7/2011 | Fong | H04L 5/0053 | 370/329 |
| 2011/0188815 A1* | 8/2011 | Blackwell, Jr. | H05K 1/11 | 385/88 |
| 2012/0039320 A1* | 2/2012 | Lemson | H03F 1/3247 | 370/338 |
| 2012/0057572 A1* | 3/2012 | Evans | H04W 88/085 | 370/338 |
| 2012/0106963 A1* | 5/2012 | Huang | H04Q 11/0067 | 398/66 |
| 2012/0121270 A1 | 5/2012 | Logan | | |
| 2012/0163818 A1* | 6/2012 | Lee | H04B 10/272 | 398/67 |
| 2012/0176667 A1* | 7/2012 | He | H04B 10/2942 | 359/344 |
| 2012/0309349 A1 | 12/2012 | Schmidt et al. | | |
| 2013/0095875 A1* | 4/2013 | Reuven | H04B 7/10 | 455/509 |
| 2013/0343241 A1* | 12/2013 | Niu | H04B 15/00 | 370/280 |
| 2014/0072064 A1* | 3/2014 | Lemson | H04B 7/04 | 375/267 |
| 2014/0126914 A1* | 5/2014 | Berlin | H04B 7/0413 | 398/116 |
| 2015/0303999 A1* | 10/2015 | Zhuang | H04B 7/024 | 370/329 |
| 2015/0351088 A1* | 12/2015 | Gutman | H04W 72/048 | 370/336 |

FOREIGN PATENT DOCUMENTS

| | | |
|---|---|---|
| EP | 2654258 A2 | 10/2013 |
| WO | 2011100095 A1 | 8/2011 |
| WO | 2011148341 A1 | 12/2011 |

OTHER PUBLICATIONS

International Search Report and Written Opinion of the International Searching Authority received in Patent Cooperation Treaty Application No. PCT/CN2015/082885 dated Sep. 25, 2015, 12 pages.

* cited by examiner

PHALANX RADIO SYSTEM ARCHITECTURE FOR HIGH CAPACITY WIRELESS COMMUNICATION

TECHNICAL FIELD

The present invention relates to a system and method for wireless communications, and, in particular embodiments, to a system and method for high capacity wireless communication.

BACKGROUND

With the explosive growth of smart phones, tablets and mobile broadband dongles across the globe, the demand for mobile broadband grows as never before. Therefore high capacity technologies have become a key point for future wireless communication systems.

Small cells technologies are foreseen as one of the solution to increase network capacity and to meet the ever increasing traffic demand. Small cells are low-powered radio access nodes that operate in related small areas. As compared to macro cells, small cells can significantly increase the network capacity and can manage spectrum more efficiently. Where the macro cell network is congested or overloaded, a small cell adds additional spectrum capacity. On the other hand, small cells present a new set of significant challenges to mobile network operators, including equipment cost and sizing, the availability of backhaul, and installation and operational complexity.

SUMMARY OF THE INVENTION

In accordance with an embodiment, a system for high capacity wireless communication includes a plurality of small radio unit modules (SRUMs) and a single central module (CM) configured to connect to the SRUMS over a high speed transport layer (TL), wherein the SRUMs each comprise a SRUM radio frequency (RF) element and an antenna, wherein the CM comprises a digital signal processor (DSP), an analog-to-digital (A/D) converter, a plurality of digital-to-analog (D/A) converters, and a plurality of CM RF elements, wherein each of the plurality of SRUMs is uniquely associated with a CM RF element, and a D/A converter thereby forming a radio unit (RU) that is configured to operate independently of other RUs.

In accordance with another embodiment, a network component configured for high capacity wireless communications includes a central module (CM) configured to connect to a link to a backhaul network and comprising a digital signal processor (DSP), a plurality of an analog-to-digital (A/D) converter, a plurality of digital-to-analog (D/A) converters, and a plurality of CM RF elements; and a plurality of small radio unit modules (SRUMs), wherein each SRUM comprises a SRUM radio frequency (RF) element and an antenna, wherein each of the SRUMs is configured to connect to the CM over a high speed transport layer (TL), wherein each of the plurality of SRUMs is uniquely associated with a CM RF element, and a D/A converter thereby forming a radio unit (RU) that is configured to operate independently of other RUs.

In accordance with another embodiment, a transmission point (TP) for high capacity wireless communication includes a plurality of low power radio units (RUs), wherein each RU comprises a plurality of radio components, wherein some of the components are located in a central module (CM) and some of the radio components are located in a small radio units module (SRUM), wherein some of the radio components located in the CM are shared by multiple RUs, and wherein the radio components in the SRUM are configured to connect to the radio components in the CM over a high speed transport layer (TL).

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
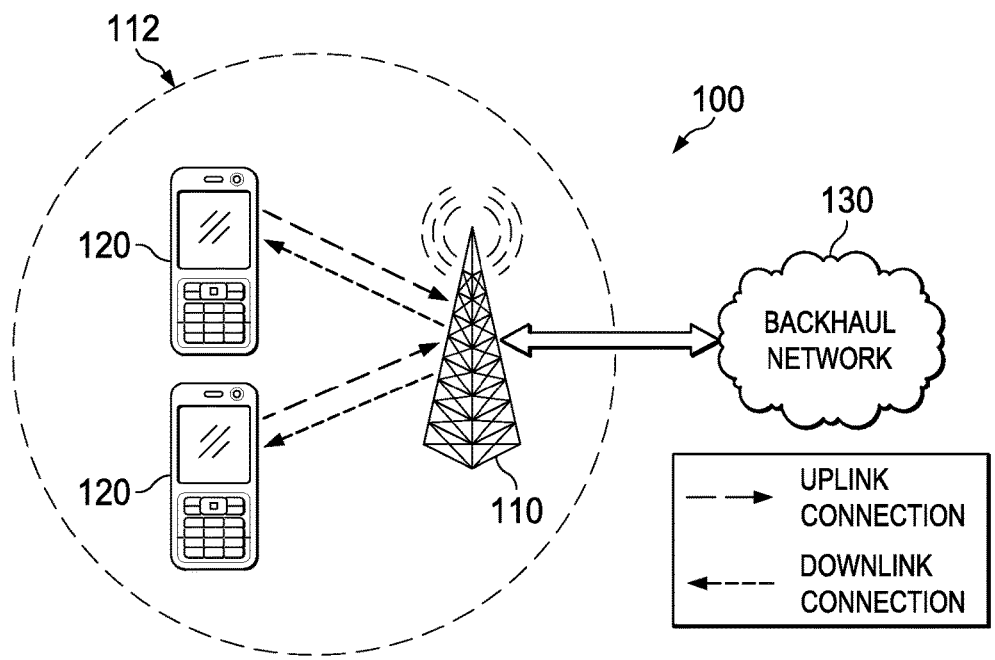
FIG. 1 illustrates a network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems and methods for a phalanx radio architecture (PRA) in which a series of small radio units (RUs) are densely integrated together. The disclosed densely integrated RUs into the same physical location, in contrast to conventional current small cell networks in which the RUs are physically distributed into different locations to cover different small cells. In contrast to typical macro cells, which have a single RU, the disclosed PRA includes a plurality of RUs. In an embodiment, the small RUs are divided into two sections: section A and section B. Components in section A are simplified to reduce their size and weight so that they can be installed in a single module—a small radio units module (SRUM). SRUMs can be mounted on, for example, radio or cell towers, sides of buildings, etc. Larger sized RF elements and digital processing and control elements are allocated to section B in, for example, a central module (CM). The CM does not have to be co-located with the SRUMs and can be located, for example, on the ground near a cell tower. Each radio unit equips a standalone radio frequency (RF) transceiver with an integrated antenna and can work independently. Multiplex structures are applied in the CM to reduce the overall system cost. The SRUM and the CM are connected through a transport layer (TL). The integrated small cell structure facilitates the design of backhaul and reduces the complexity of installation.

Serials of small RUs improve capacity of wireless systems. The system capability increases by number of RUs. Therefore, it is easy to upgrade systems. In an embodiment, each RU works independently, therefore, the system capability is easily allocated and consequently, flexible. In contrast to current small cell architectures, the disclosed integrated RU structure facilitates the design of backhaul and reduces the complexity of installation, and consequently, reduces the installation cost. The simplified SRUM reduces the size since they can simply replace current base stations, thereby reducing operating costs. The multiplex receiver structures reduce the overall system cost. Furthermore, in contrast to current small cell architectures, the disclosed phalanx structure is easy to integrate with diverse technologies such as, for example, Multiple-Input, Multiple-Output (MIMO) systems and antenna array systems.

A PRA system can be installed at one physical location as compared with typical small cell RUs that are distributed into different locations. Furthermore, a typical macro cell normally has one high-powered RU whereas the disclosed PRA has a plurality of low-powered RUs co-located at a single location. In an embodiment, high power RU refers to an RU equipped with a power amplifier over about 20 watts (W), and typically with a power amplifier of between about 40 W and about 80 W. In an embodiment, a low power RU refers to an RU equipped with a power amplifier below about 10 W and typically between about 1 W and about 5 W.

In an embodiment of the disclosed systems, methods, and apparatuses, the wireless access point (AP), transmission point (TP), base station transceiver (BTS), or base station (BS) is implemented with the disclosed PRA high capacity radio architecture. The PRA includes a plurality of small RUs which may be densely integrated together while each RU works independently of the other RUs. Each RU is distributed across a SRUM, a CM, and a TL. The SRUM includes a plurality of RF elements that operate independently of one another. The CM includes RF elements, intermediate frequency (IF) elements, baseband elements, and digital processing and control elements. The TL includes a high speed connection between the SRUM and the CM and can be implemented as optical links, electrical links, microwave links, or some combination of these links.

In an embodiment, a system for high capacity wireless communication includes a plurality of small radio unit modules (SRUMs) that may be located in an elevated position on a radio tower; and a single central module that is configured to connect to the SRUMS by, for example, a high speed transport layer (TL). In an embodiment, the high speed TL transports analog RF signals with frequency between about 700 megahertz (MHz) and about 3800 MHz. In an embodiment, the peak data rate can be over 10 Gigabits/second (Gb/s) depending on the RF signal modulation scheme. The SRUMs each include a SRUM radio frequency (RF) element and an antenna. The CM includes a digital signal processor (DSP), an analog-to-digital (A/D) converter, a plurality of digital-to-analog (D/A) converters, and a plurality of CM RF elements. Each SRUM radio element is uniquely associated with one CM RF element and one D/A converter to form at least a portion of a radio unit (RU) that is configured to operate independently of the other RUs. The DSP and the A/D are shared by multiple RUs. In an embodiment, each SRUM includes a transmitter (Tx) power amplifier (PA), an automatic gain control (AGC) amplifier, an antenna, and a duplexer connected to the antenna, the Tx PA, and the AGC amplifier, wherein the duplexer provides Tx signals from the Tx PA to the antenna and provides Rx signals from the antenna to the AGC amplifier. In an embodiment, the CM further includes a multiplex receiver (MRX) that is shared by multiple RUs. The MRX may be a time division multiplex (TDMx) MRX or a frequency division multiplex (FDMx) MRX. The RUs are low-power RUs. The TL may be one of an optical link, a microwave link, and an electrical link. In an embodiment, the CM is not co-located in an elevated position near location of the SRUMs on the radio tower.

In an embodiment, a transmission point (TP) for high capacity wireless communication, includes a plurality of low power radio units (RUs). Each RU includes a plurality of radio components, wherein some of the components are located in a central module (CM) and some of the radio components are located in a small radio units module (SRUM). The SRUM may be located, for example, at an elevated location on a radio transmission tower. In an embodiment, the total weight of the radio components located in the SRUM is lower than the total weight of the radio components located in the CM. In other embodiments, the weight of the SRUM can be higher than the CM, depending on the particular design. However, in an embodiment, it is desirable to make the SRUM as small and as light as possible. Some of the radio components located in the CM are shared by multiple RUs. The radio components in the SRUM are configured to connect to the radio components in the CM by a transport layer (TL).

In an embodiment, a transmission point (TP) for high capacity wireless communication includes a plurality of low power radio units (RUs). Each RU comprises a plurality of radio components, wherein some of the components are located in a central module (CM) and some of the radio components are located in a small radio units module (SRUM). The SRUM can be located at an elevated location on a radio transmission tower. Some of the radio components located in the CM are shared by multiple RUs. The radio components in the SRUM are configured to connect to the radio components in the CM by a transport layer (TL).

FIG. 1 illustrates a network 100 for communicating data. The network 100 comprises an access point (AP) 110 having a coverage area 112, a plurality of user equipment (UEs) 120, and a backhaul network 130. As used herein, the term AP may also be referred to as a TP and the two terms may be used interchangeably throughout this disclosure. The AP 110 may comprise any component capable of providing wireless access by, inter alia, establishing uplink (dashed line) and/or downlink (dotted line) connections with the UEs 120, such as a base transceiver station (BTS), an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

In an embodiment, the AP 110 and UEs 120 are configured to operate in FD mode. In order to provide high isolation of transmitter power from on frequency co-located receivers in the AP 110, the AP 110 includes a self-interference cancellation system or circuit described in more detail below. In an embodiment, the AP 110 is a cellular AP. In another embodiment, the AP 110 is a WiFi AP.

In an embodiment, the AP 110 is implemented as a PRA and includes a plurality of RUs with components of each RU divided between a SRUM and a CM. In an embodiment, the network 100 is a 5th generation mobile network or 5th generation wireless system (5G).

Figure 2:
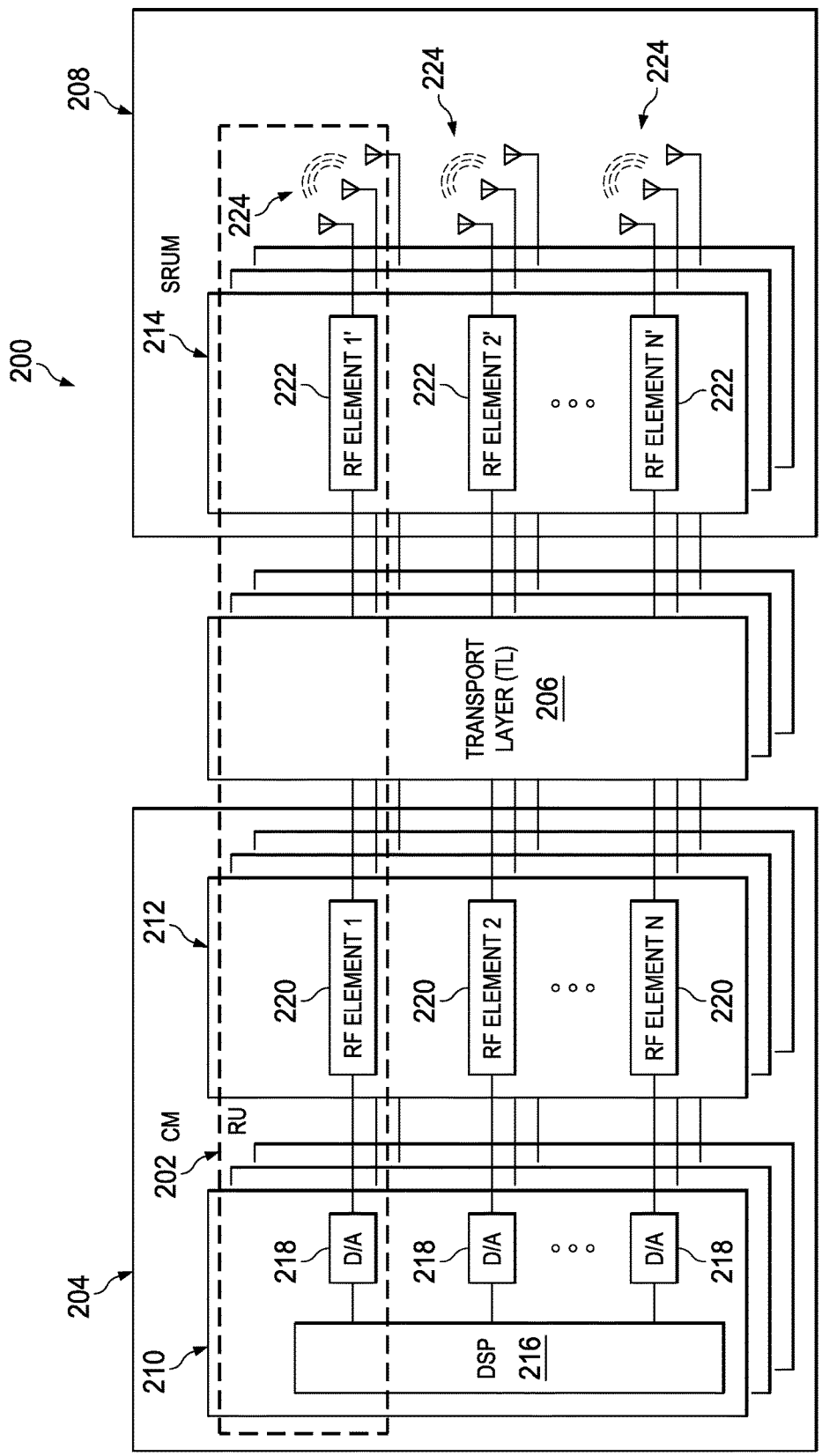
FIG. 2 is a block diagram of an embodiment phalanx radio architecture (PRA)

FIG. 2 is a block diagram of an embodiment PRA 200. PRA 200 includes a plurality of RUs 202. The various components of each RU 202 are divided up into two sections connected by a TL 206. The two sections are the CM 204 and the SRUM 208. Each RU 202 is a low-powered node and works as a standalone component to communicate with different users. The SRUM is designed for operation, for example, on a cell tower while the CM 204 is designed, for example, as an on ground module. However, the CM 204 is not restricted to placement on or near the ground, but may be situated in any manner and location that is appropriate to the particular implementation. In an embodiment, the SRUM 208 is substantially optimized to have a substantially minimal number of elements in order to achieve a small size and low weight. The elements in the SRUM 208 usually include those elements that usually need to be placed near the top of a cell tower or other elevated location in order to provide maximum wireless coverage and to reduce the interference caused by objects on or near the ground.

In an embodiment, the SRUM 208 includes a plurality of RF elements 222 (one for each RU 202) and a plurality of antenna elements 224 (one for each RU 202). Each RF element 222 is connected to a corresponding antenna element 224. The SRUM 208 and TL typically only include analog components.

In an embodiment, the CM 202 includes digital components 210 and analog components 212. The digital components 210 of the CM 204 include a DSP 216 that can be shared by multiple RUs 202 and also include a plurality of digital-to-analog (D/A) converters 218 (one per RU 202). The analog components 212 of the CM 204 include a plurality of RF elements 220 (one per RU 202). Each RF element 220 is connected to a respective one of the RF elements 222 in the SRUM 208 connected via the TL 206. The TL 206 supports broad band connection. The TL 206 can be implemented as optical links, electrical links, microwave links, or a combination thereof.

Figure 3:
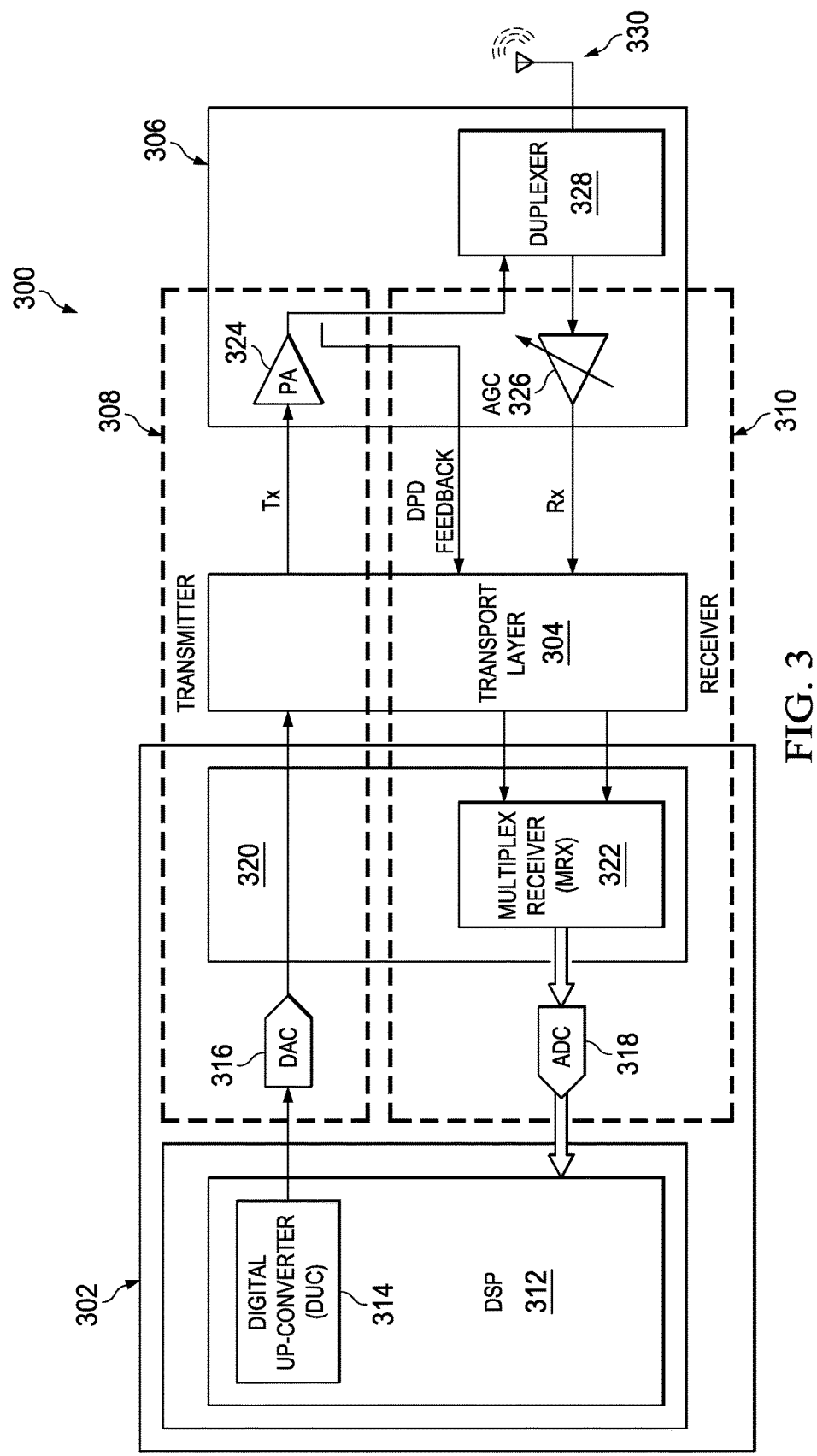
FIG. 3 is a block diagram of a single embodiment radio unit (RU)

FIG. 3 is a block diagram of a single embodiment RU 300. RU 300 may be implemented as any one of the RUs 202 in FIG. 2. The components of the RU 300 are separated into two sections: the CM 302 and the SRUM 306. The two sections are connected via the TL 304. The RU 300 includes a transmitter 308 and a receiver 310. The SRUM includes a power amplifier (PA) 324 for the transmitter 308, a variable automatic gain control (AGC) amplifier 326 for the receiver 310, an antenna 330, and a duplexer 328 to duplex transmit signals to and receive signals from the antenna 330. The CM 302 includes a DSP 312, a digital up-converter (DUC) 314 for the transmitter 308, a D/A for the transmitter 308, an multiplex receiver (MRX) 322 for the receiver 310, and an analog-to-digital (A/D) converter 318 for the receiver 310.

The receiver 310 includes digital pre-distortion (DPD) feedback and an RF signal from the antenna 330. In the transmitter 308, digital transmit (Tx) signals are up-converted through a digital up-converter (DUC) 314.

Receiver (Rx) signals from the antenna and DPD feedback signals are sent from the SRUM 306 to the CM 302 via the TL 304. The signals are then down-converted, digitized through the MRX 322, and sent to the DSP 312 for processing. In the MRX 322, the Rx and DPD feedback signals from a group of RUs share one down-converter and a single A/D 318 by applying various multiplex technologies.

Figure 4:
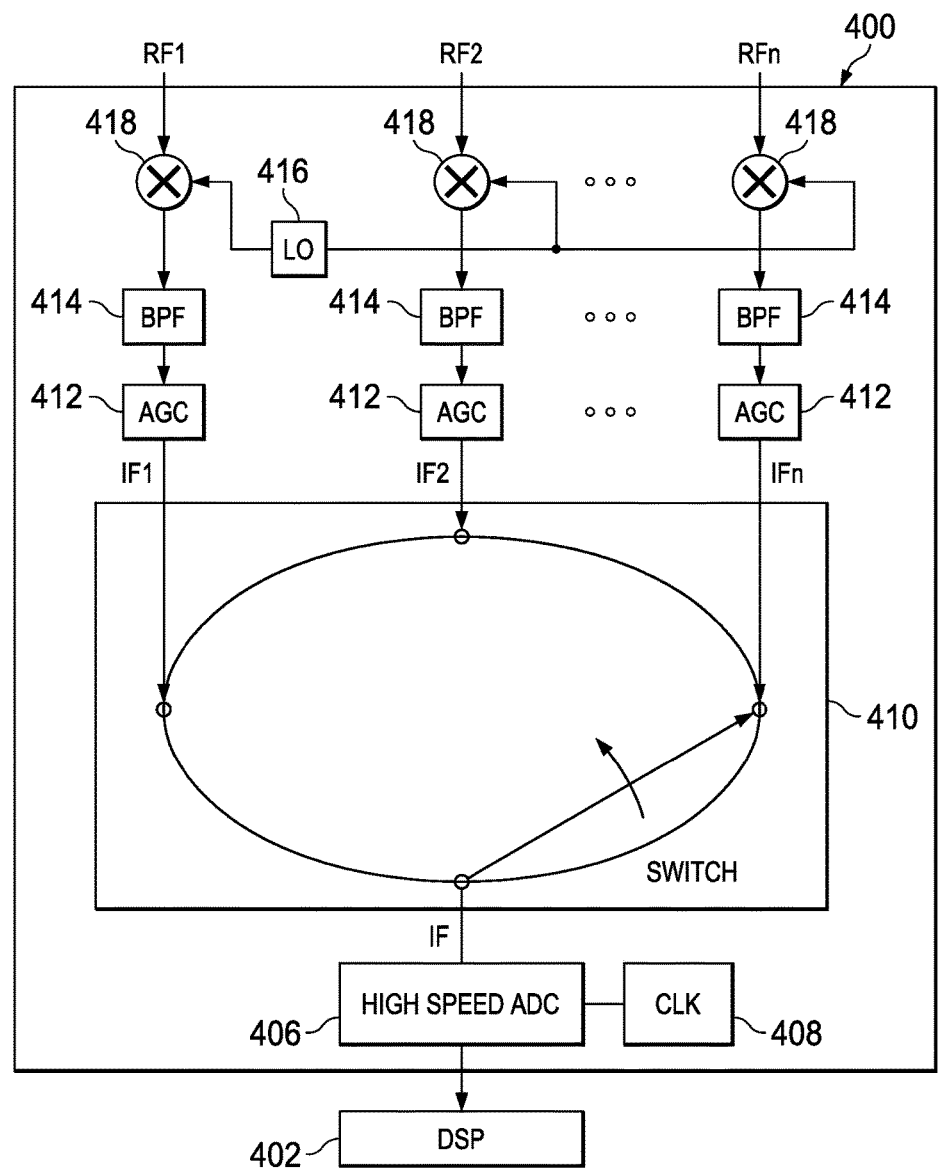
FIG. 4 is a block diagram of an embodiment Time Division Multiplex (TDMx) multiplex receiver (MRX)

FIG. 4 is a block diagram of an embodiment Time Division Multiplex (TDMx) MRX 400. TDMx MRX 400 may be implemented as the MRX 322 in FIG. 3. The TDMx MRX 400 includes a plurality of mixers 418, a single local oscillator (LO) 416, a plurality of band pass filters (BPFs) 414, a plurality of variable AGC amplifiers 412, a switch 410, a high speed analog-to-digital convertor (ADC) 406, and a clock (CLK) 408. Each mixer 418 receives a respective RF signal (e.g., RF1, RF2, . . . , RFn) and mixes the received RF signal with the output from the LO 416. The output of each mixer 418 passes through a respective BPF 414 and then through a respective AGC 412. The output (e.g., IF1, IF2, . . . , IFn) from each AGC 412 is provided to the switch 410 which provides each output signal (e.g., IF1, IF2, . . . , IFn) to the high speed ADC 406 in turn. The output of the high speed ADC 406 is provided to the DSP 402 for processing.

Figure 5:
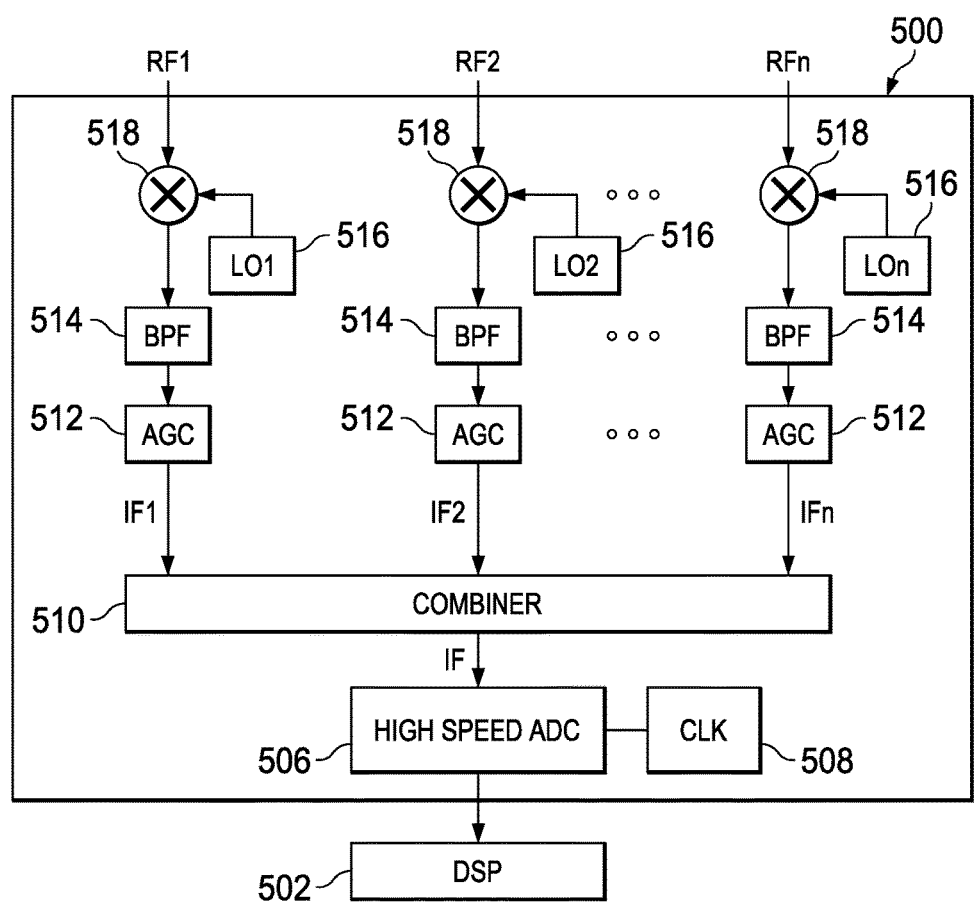
FIG. 5 is a block diagram of an embodiment Frequency Division Multiplex (FDMx) MRX.

FIG. 5 is a block diagram of an embodiment Frequency Division Multiplex (FDMx) MRX 500. The FDMx MRX 500 may be implemented as the MRX 322 in FIG. 3. The FDMx MRX 500 includes a plurality of mixers 518, a plurality of LOs 516, a plurality of BPFs 514, a plurality of variable AGC amplifiers 512, a combiner 510, a high speed ADC 506, and a CLK 508. Each mixer 518 receives a respective RF signal (e.g., RF1, RF2, . . . , RFn) and mixes the received RF signal with the output from its respective LO 516. The output of each mixer 518 passes through a respective BPF 514 and then through a respective AGC 512. The output (e.g., IF1, IF2, . . . , IFn) from each AGC 512 is provided to the combiner 510 which provides a single output signal (e.g., IF) to the high speed ADC 506. The output of the high speed ADC 506 is provided to the DSP 502 for processing.

Figure 6:
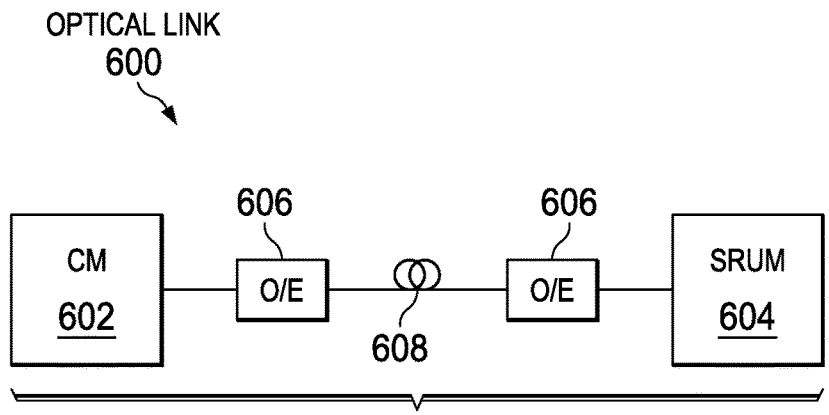
FIG. 6 is a block diagram of an embodiment optical link for the transmission layer (TL)

FIG. 6 is a block diagram of an embodiment optical link 600 for the TL. Optical link 600 may be used to implement the TL 206 in FIG. 2. The optical link 600 includes an optical-to-electrical (O/E) converter 606 connected to each of the CM 602 and the SRUM 604. The two O/E converters 606 are connected by an optical waveguide 608, such as, for example, an optical fiber. The O/E converters 606 convert electrical signals to optical signals for transmission along the optical waveguide 608. The O/E converters 606 also convert optical signals received from the optical waveguide 608 into electrical signals.

Figure 7:
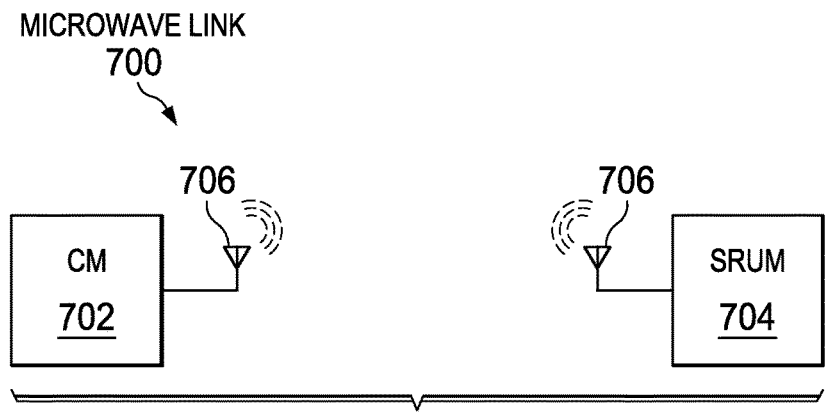
FIG. 7 is a block diagram of an embodiment microwave link for the TL.

FIG. 7 is a block diagram of an embodiment microwave link 700 for the TL. Microwave link 700 may be used to implement the TL 206 in FIG. 2. The microwave link includes and antenna 706 connected to the CM 702 and an antenna 706 connected to the SRUM 704. Signals between the SRUM and the CM 702 are transmitted wirelessly by the microwave link established between the two antennas 706.

Figure 8:
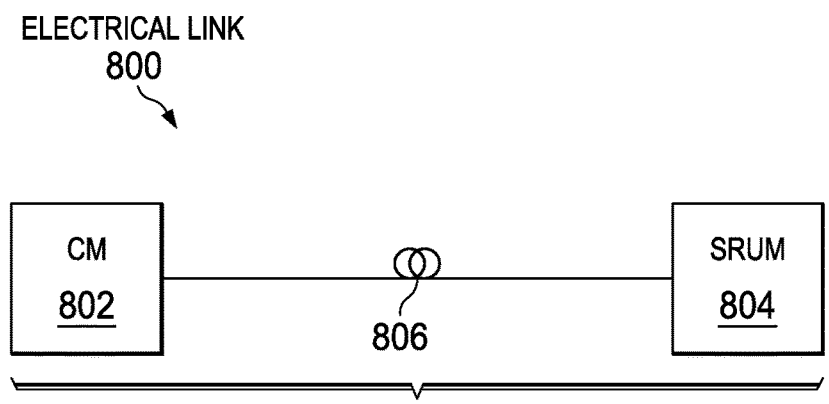
FIG. 8 is a block diagram of an embodiment electrical link for the TL.

FIG. 8 is a block diagram of an embodiment electrical link 800 for the TL. Electrical link 800 may be used to implement the TL 206 in FIG. 2. The electrical link 806 includes an electrical waveguide 806 for transporting electrical signals between the SRUM 804 and the CM 802. The electrical waveguide 806 may be electrically conducting wire, a coaxial cable, or other means for electrically transporting signals.

Figure 9:
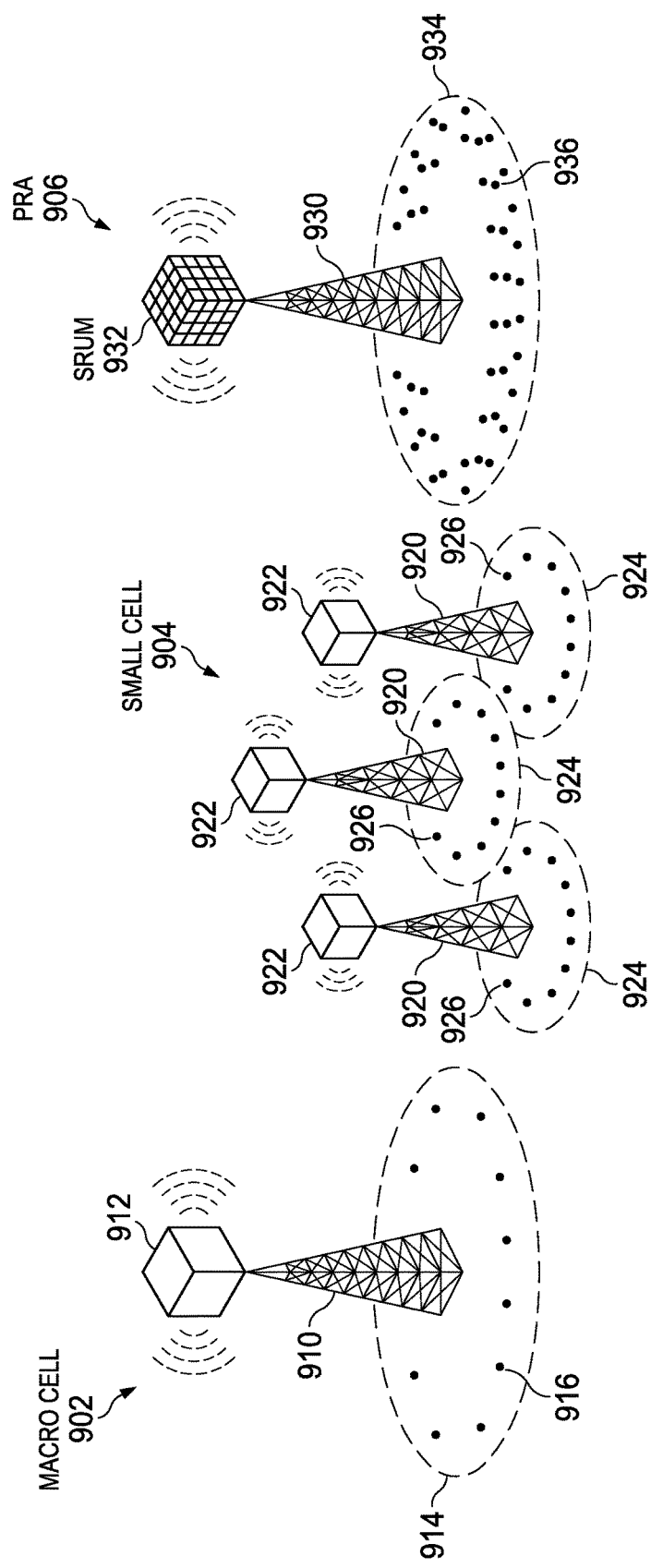
FIG. 9 is a schematic diagram illustrating three different types of wireless architectures.

FIG. 9 is a schematic diagram illustrating three different types of wireless architectures. The three types of wireless architectures include a macro cell architecture 902, a small cell architecture 904, and an embodiment of the disclosed PRA 906. The macro cell architecture 902 includes a single cell tower 910 with a single RU 912 that provides a wireless service for a plurality of UEs 916 within a coverage area 914.

The small cell architecture 904 includes a plurality of cell towers 920 each with a respective small RU 922. Each RU provides wireless service to a plurality of UEs 926 within its respective coverage area 924. Each cell tower 920 has a smaller coverage area than is provided by the coverage area 916 of the macro cell tower 910. The total coverage area of the small cell architecture 904 provided by all of the small cell's coverage areas 924 may be roughly similar in size to that of the coverage area 916 of the macro cell. However, the small cell architecture 904 may provide wireless service to more UEs 926 than can be provided by the macro cell tower 910.

The PRA 906 includes a single cell tower 930 with a plurality of SRUMs 932 on top of the cell tower 930. The CM may be located at the base of the cell tower 930, near the cell tower 930, or in some other location. The coverage area 934 serviced by the SRUMs 932 is roughly equivalent to that of the macro cell architecture 902. However, the number of UEs 936 serviced by the SRUMs 932 is greater than the number of UEs 916 serviced by the macro cell tower 910. Each SRUM 932 on the tower 930 services some subset of the UEs 936 in the coverage area 934. Thus, the PRA 906 provides the benefits of the macro cell 902 (e.g., a single cell tower for a given coverage area) with the benefits of the small cell architecture 904 (e.g., high capacity wireless communication to more UEs than the macro cell can provide). However, the PRA 906 is cheaper and easier to implement than the small cell architecture 904 since a single cell tower 930 can be utilized for a given coverage area size and since only a minimum number of components are placed at the top of the cell tower, thereby conserving space for implementing more RUs. Furthermore, the PRA avoids duplication of some elements that may be shared by multiple RUs, whereas in the small cell architecture, each RU has to have a complete set of components that cannot be shared between RUs since the RUs are physically (i.e., geographically) dispersed from one another. Also, the backhaul for the small cell architecture 904 is more complex than that of the PRA 906.

Figure 10:
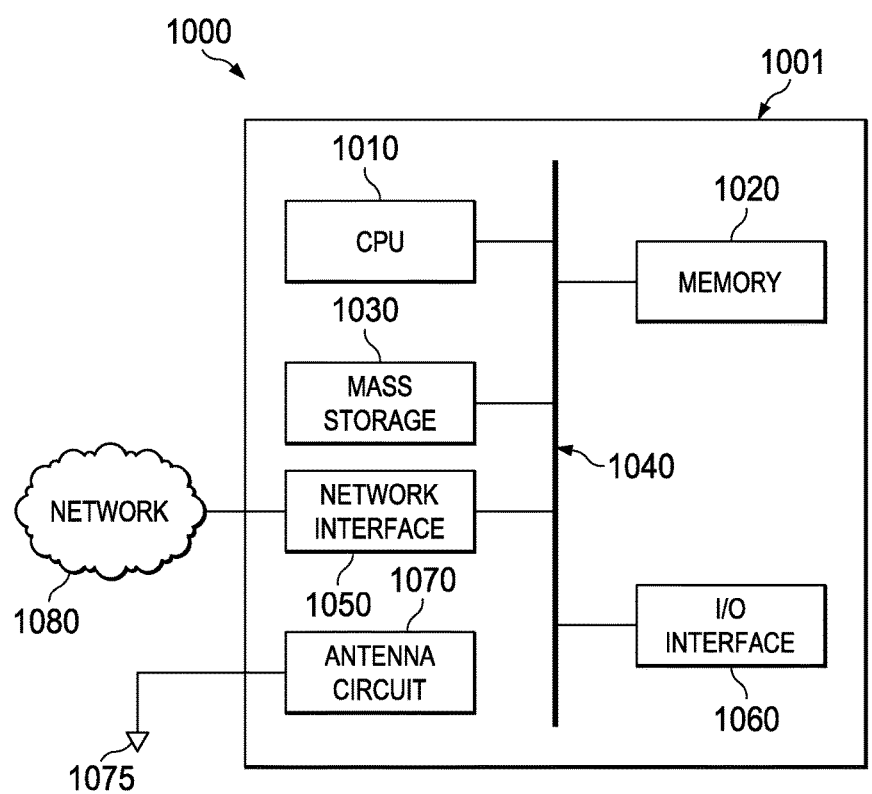
FIG. 10 is a processing system that can be used to implement various embodiments.

FIG. 10 is a block diagram of a processing system 1000 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a speaker, microphone, mouse, touchscreen, keypad, keyboard, printer, display, and the like. The processing unit 1001 may include a central processing unit (CPU) 1010, memory 1020, a mass storage device 1030, a network interface 1050, an I/O interface 1060, and an antenna circuit 1070 connected to a bus 1040. The processing unit 1001 also includes an antenna element 1075 connected to the antenna circuit.

The bus 1040 may be one or more of any type of several bus architectures including a memory bus or memory controller, a peripheral bus, video bus, or the like. The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs.

The mass storage device 1030 may comprise any type of storage device configured to store data, programs, and other information and to make the data, programs, and other information accessible via the bus 1040. The mass storage device 1030 may comprise, for example, one or more of a solid state drive, hard disk drive, a magnetic disk drive, an optical disk drive, or the like.

The I/O interface 1060 may provide interfaces to couple external input and output devices to the processing unit 1001. The I/O interface 1060 may include a video adapter. Examples of input and output devices may include a display coupled to the video adapter and a mouse/keyboard/printer coupled to the I/O interface. Other devices may be coupled to the processing unit 1001 and additional or fewer interface cards may be utilized. For example, a serial interface such as Universal Serial Bus (USB) (not shown) may be used to provide an interface for a printer.

The antenna circuit 1070 and antenna element 1075 may allow the processing unit 1001 to communicate with remote units via a network. In an embodiment, the antenna circuit 1070 and antenna element 1075 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. Additional, in some embodiments, the antenna circuit 1070 operates in Full Duplex (FD) mode. In some embodiments, the antenna circuit 1070 and antenna element 1075 may also provide Bluetooth and/or WiFi connection to other devices. In an embodiment, the antenna circuit 1070 includes a transmitted signal cancellation system.

The processing unit 1001 may also include one or more network interfaces 1050, which may comprise wired links, such as an Ethernet cable or the like, and/or wireless links to access nodes or different networks. The network interface 1001 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A system for wireless communication, the system comprising:
   a plurality of small radio unit modules integrated into a single module in a first physical location; and
   a single central module (CM) configured to connect to the small radio unit modules over a transport layer (TL),
   wherein each small radio unit module comprise a small radio unit module radio frequency (RF) element and an antenna, wherein the CM comprises a digital signal processor (DSP), an analog-to-digital (A/D) converter, a plurality of digital-to-analog (D/A) converters, and a plurality of CM RF elements, wherein each of the plurality of small radio unit modules is uniquely associated with a CM RF element, and a D/A converter thereby forming a radio unit (RU) that is configured to operate independently of other RUs, and wherein the first physical location of the plurality of small radio unit modules is different from a physical location of the CM.

2. The system of claim 1, wherein each small radio unit module comprises a transmitter (Tx) power amplifier (PA), an automatic gain control (AGC) amplifier, an antenna, and a duplexer connected to the antenna, the Tx PA, and the AGC amplifier, wherein the duplexer provides Tx signals from the Tx PA to the antenna and provides Rx signals from the antenna to the AGC amplifier.

3. The system of claim 1, wherein the CM further comprises a multiplex receiver (MRX) that is shared by multiple RUs.

4. The system of claim 3, wherein the MRX is a time division multiplex (TDMx) MRX.

5. The system of claim 3, wherein the MRX is a frequency division multiplex (FDMx) MRX.

6. The system of claim 1, wherein the RUs comprise a power less than 10 watts.

7. The system of claim 1, the TL comprises one of an optical link, a microwave link, and an electrical link.

8. The system of claim 1, wherein the DSP and the A/D are shared by multiple RUs.

9. The system of claim 1, wherein the CM is not co-located in an elevated position on a radio tower that is proximate the small radio unit modules.

10. A network component configured for wireless communications, comprising:
a central module (CM) configured to connect to a link to a backhaul network and comprising a digital signal processor (DSP), a plurality of an analog-to-digital (A/D) converter, a plurality of digital-to-analog (D/A) converters, and a plurality of CM RF elements; and
a plurality of small radio unit modules small radio unit modules integrated into a single physical location, wherein each small radio unit module comprises a small radio unit module radio frequency (RF) element and an antenna, wherein each of the s is configured to connect to the CM over a transport layer (TL),
wherein each of the plurality of small radio unit modules is uniquely associated with a CM RF element, and a D/A converter thereby forming a radio unit (RU) that is configured to operate independently of other RUs, and
wherein the single physical location of the plurality of small radio unit modules is different from a physical location of the CM.

11. The network component of claim 10, wherein each comprises a transmitter (Tx) power amplifier (PA), an automatic gain control (AGC) amplifier, an antenna, and a duplexer connected to the antenna, the Tx PA, and the AGC amplifier, wherein the duplexer provides Tx signals from the Tx PA to the antenna and provides Rx signals from the antenna to the AGC amplifier.

12. The network component of claim 10, wherein the CM further comprises a multiplex receiver (MRX) that is shared by multiple RUs.

13. The network component of claim 12, wherein the MRX is a time division multiplex (TDMx) MRX.

14. The network component of claim 12, wherein the MRX is a frequency division multiplex (FDMx) MRX.

15. The network component of claim 10, wherein the RUs comprise a power less than 10 watts.

16. The network component of claim 10, the TL comprises one of an optical link, a microwave link, and an electrical link.

17. The network component of claim 10, wherein the CM is not co-located near the top of a radio tower proximate the s.

18. A transmission point (TP) for wireless communication, comprising:
a plurality of radio units (RUs), each RU comprises a power less than 10 watts,
wherein each RU comprises a plurality of radio components, wherein some of the components are located in a central module (CM) and some of the radio components are located in a small radio units module,
wherein a plurality of small radio unit modules are integrated into a single physical location,
wherein some of the radio components located in the CM are shared by multiple RUs,
wherein the radio components in the small radio unit module are configured to connect to the radio components in the CM over a transport layer (TL), and
wherein the single physical location of the plurality of small radio unit modules is different from a physical location of the CM.

19. The TP of claim 18, wherein the CM comprises a digital signal processor (DSP), a plurality of an analog-to-digital (A/D) converters, a plurality of digital-to-analog (D/A) converters, and a plurality of CM RF elements.

20. The TP of claim 19, wherein the DSP and the A/D are shared by multiple RUs.

21. The TP of claim 18, wherein the each of the small radio unit modules comprises a small radio unit module radio frequency (RF) element and an antenna.

22. The TP of claim 18, wherein each small radio unit module comprises a transmitter (Tx) power amplifier (PA), an automatic gain control (AGC) amplifier, an antenna, and a duplexer connected to the antenna, the Tx PA, and the AGC amplifier, wherein the duplexer provides Tx signals from the Tx PA to the antenna and provides Rx signals from the antenna to the AGC amplifier.

23. The TP of claim 18, wherein the CM comprises a multiplex receiver (MRX) that is shared by multiple RUs.

24. The TP of claim 23, wherein the MRX is a time division multiplex (TDMx) MRX.

25. The TP of claim 23, wherein the MRX is a frequency division multiplex (FDMx) MRX.

26. The TP of claim 18, the TL comprises one of an optical link, a microwave link, and an electrical link.

* * * * *